Patented Jan. 9, 1934

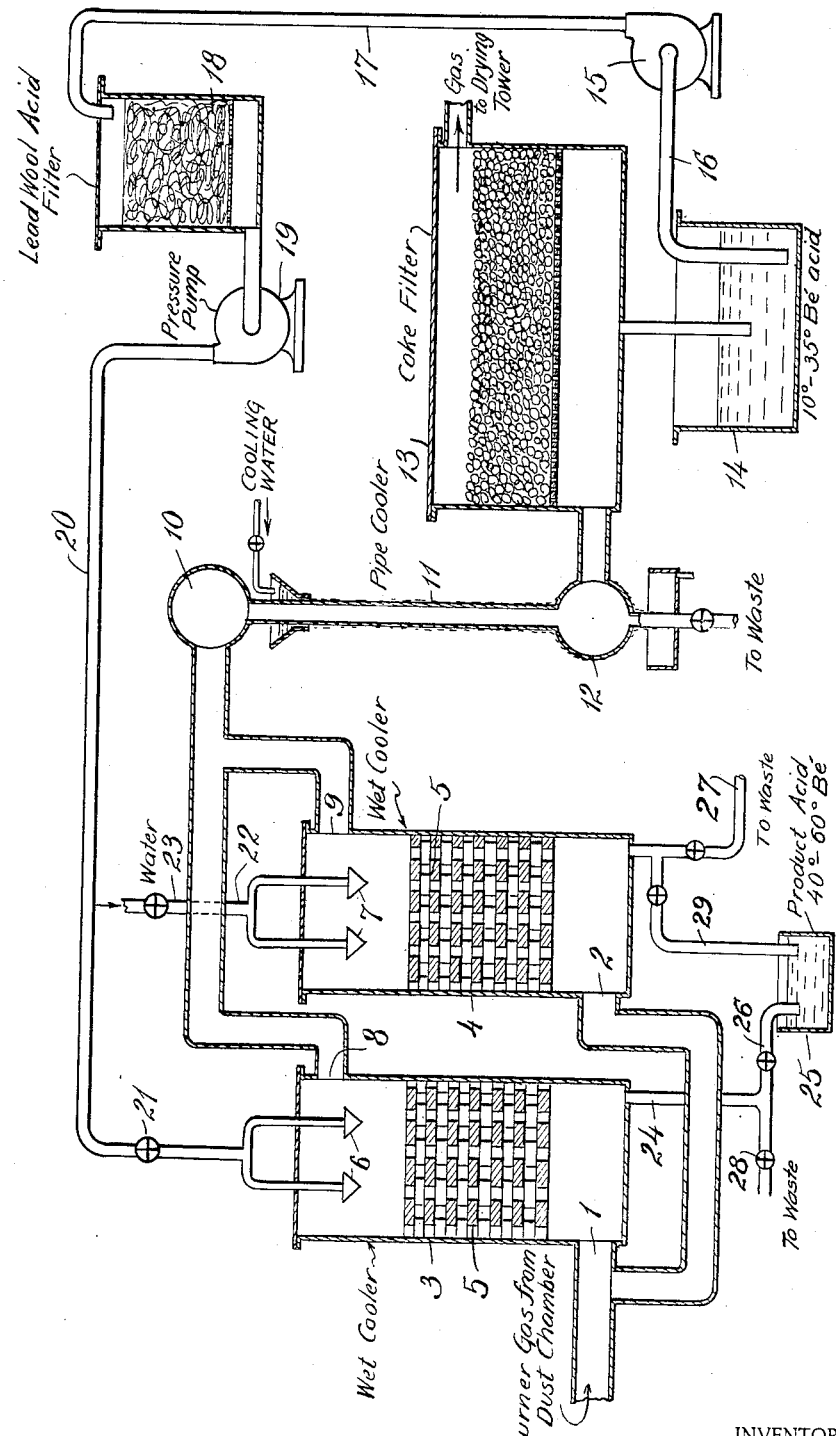

1,943,137

UNITED STATES PATENT OFFICE 1,943,137

PROCESS OF COOLING AND PURIFYING BURNER GASES

Edwin J. Mullen, New Rochelle, N. Y., assignor to General Chemical Company, New York, N. Y., a corporation of New York Application September 28, 1927
Serial No. 222,626

19 Claims. (Cl. 23—178)

This invention relates to the purification of burner gas such as is produced from sulfur or sulfide ores and other materials used in the manufacture of sulfuric acid, and especially to a purification which will render such gas suitable for the manufacture of sulfuric anhydride and of sulfuric acid by the so-called "contact process" in which the sulfur dioxide content in such gas is caused to combine with oxygen by the catalytic action of platinum or equivalent material.

In the process at present commonly used for the manufacture of sulfuric acid by the contact process, hot burner gas containing sulfur dioxide produced by burning sulfurous material such as brimstone or pyrites is prepared for treatment in the converters by being cooled, filtered, dried, and reheated to a suitable temperature for entry into the converters. Before cooling, the burner gas is usually first passed through dust chambers of standard type well known in this industry, to partially separate out the entrained solid particles, and is then subjected to treatment in a wet cooler, that is, a gas cooling tower in which the hot gas is contacted with a large quantity of cool sulfuric acid of about 45° to 55° Baumé strength. In the gas cooling tower the gas is partially freed from dust and solid particles and is cooled to about 200–300° F. From the wet coolers the gas is passed through tubular pipe coolers where it is further cooled and a portion of the contained moisture separated out. These coolers consist frequently of horizontal or vertical lead pipes, the outside surfaces of which are in contact with cooling water. The gas is then filtered, usually through coke filters, and the sulfuric acid mist present therein is thereby separated out. The acid thus separated is at a strength of about 20-22° Baumé and ordinarily amounts to from 3 to 8% of the theoretical yield of sulfuric acid calculated on the quantity of sulfur burned. The filtered gas is then dried by contacting it with relatively concentrated sulfuric acid in drying towers and is then ready to be reheated and sent to the converter system.

In operating the above mentioned wet coolers according to the present known practice, as much as 150-200 lbs. of scrubbing acid of 45° to 55° Baumé are employed per 1000 cubic feet of burner gas and a major portion of the acid contacted with the gas is recirculated again and again through the gas cooling tower. During its passage through the tower, the relatively strong acid is slightly concentrated 2-3 degrees Baumé by the evaporation of water therefrom into the hot burner gas. The acid leaving the tower is conducted thru elaborate coolers to lower its temperature, this operation resulting in the precipitation of arsenic and iron compounds. A very small portion, approximately 1 to 2%, of the acid after passing through the coolers is then withdrawn as product. To make up for the proportion of acid that is withdrawn and to dilute the acid (which as above stated has been slightly concentrated) to normal operating strength, the weak (20–22° Baumé) acid separated out in the coke filter, together with water if necessary, is added thereto and the mixed acid sent back to the scrubbing towers. In this manner the weak acid separated out in the coke filters is continuously added to the recirculating scrubbing acid and is thus ultimately concentrated to form a marketable product, and the burner gas is simultaneously purified.

This method of cooling and purification has, however, serious disadvantages. First, the large amount of purifying acid employed in the scrubbing towers requires an elaborate system of tanks, cooler, pipes, pumps, etc., all of which must be of lead construction or otherwise made to resist the corrosive action of sulfuric acid, and furthermore a high power consumption is entailed in the handling of the acid. Secondly, and of greater seriousness, the recirculated purifying acid, being saturated with impurities, particularly arsenic and iron oxide, as it leaves the scrubbing tower, precipitates a portion of this arsenic and iron oxide in the coolers and circulation system, thereby plugging up the pumps and pipe lines and forming a hard, dense crust upon the lead work which can be removed only by costly cleaning operations which are very destructive of the apparatus. The maintenance cost of the system is excessive, and the efficiency thereof is low due to the constant tendency toward plugging of the pipe lines and deposition of scale upon the cooling surfaces.

The primary object of the present invention is to provide an improved process for the efficient cooling and purification of burner gas which will overcome these disadvantages enumerated. A further object is to provide a process whereby the weak acid separated out in the coke filters may be efficiently and economically concentrated to produce a marketable product of desired strength. Further objects and advantages will appear from a reading of the following description of my invention.

For convenience in describing my invention, reference is made to the accompanying drawing, which represents diagrammatically a preferred system for cooling and purifying burner gases embodying my invention.

The present invention is based upon certain discoveries, the foremost of which is the fact that in the cooling of hot burner gas by contact with relatively cold liquid, substantially the entire decrease in the temperature of the gas is produced by the evaporation of the cold scrubbing fluid into such gas in contra-distinction to cooling by heat transfer from the gaseous body to the liquid body in which substantially all of the heat transferred serves merely to increase the temperature of the liquid body. Accordingly, for efficient cooling of the hot burner gas it is requisite that the most favorable conditions should be provided for the evaporation of the cooling fluid. A further discovery which is of basic importance in determining the economic value of the present invention is the fact that the weak acid (normally less than 35° Baumé) obtained from the coke filters in the standard purification systems is particularly adapted for use as a cooling fluid in the scrubbing or cooling towers, that the water in such weak acid is subject to rapid evaporation when the acid is contacted with the hot gas, and that such weak acid when utilized under conditions for efficient cooling of the burner gas may be substantially concentrated (at least 15° Baumé) by a single passage through the tower to an acid of such strength that it is readily marketable (40° to 60° Baumé).

The present invention consists in contacting hot burner gas with weak acid (below 35° Baumé) in a highly dispersed state or under such conditions as to provide for rapid evaporation of the water therefrom whereby the hot burner gas is cooled below 300° F. and whereby the acid is concentrated a substantial amount (at least 15° Baumé), in a single period of contact with the gas, further cooling the gas to condense and separate out a substantial portion of the water vapor contained therein, removing the condensed sulfuric acid mist from the cooled gas and utilizing this condensed and recovered acid as the weak acid above mentioned for cooling a further quantity of hot burner gas.

In carrying out the present invention, hot burner gas produced by the combustion of sulfurous material such as brimstone or pyrites with air, either with or without a partial precipitation of dust particles in suitable dust chambers is conducted through the inlets 1 and 2 to the wet cooling or scrubbing towers 3 and 4. The gas entering these towers is normally at a temperature of 700° to 1000° F. The towers 3 and 4 are of suitable acid-proof construction and may be open or partially packed. Preferably the lower half of each tower is fitted with a checkerwork 5, 5 of acid-proof brick, such structure serving to increase the efficiency of the gas-liquid contact.

Near the top of each tower is located a plurality of sprays 6, 7 directed downwardly and designed to inject the cooling fluid into the tower in a high degree of dispersion. I have found that the use of sprays is preferable because of the intimate contact brought about between liquid and gas by this means, thus providing most favorable conditions for evaporation of water vapor. Other means for causing intimate contact between liquid and gas may be used, however, such as a relatively high tower filled with packing material. As the hot burner gas ascends over the checkerwork and through the open zone there-above, it comes into the most intimate contact with the descending dispersed cooling fluid and such cooling fluid is rapidly evaporated into the gas stream with a lowering of the temperature to 300° F. or below. The cooled gas reaching the top of the towers is withdrawn through the outlets 8 and 9 and passes to a header 10. The gas is further cooled and a portion of the evaporated moisture condensed in any of the well-known types of pipe coolers, which may consist as designated by the numeral 11 of a plurality of vertical lead pipes, the outer surfaces of which are cooled by water. In the pipe cooler, the temperature of the gas is reduced to about 100° F., but the moisture precipitated therein contains substantially no sulfuric acid and such condensate may be collected in the header 12 and discharged as waste or if desired this condensate may be returned into the gas cooling towers with the acid from the filters described hereinafter.

The gas from the header 12 still contains sulfuric acid in the form of a fine mist produced by the partial conversion of the sulfur dioxide to sulfur trioxide in the burner and the subsequent condensation of the sulfur trioxide with the moisture in the system. To remove this acid mist, the gas is filtered through one or more coke filters 13, and the acid thereby removed collected in the tank 14. The gas thus cooled and purified is ready to pass to the sulfuric acid drying tower where any remaining moisture is removed and thence to the preheaters and converters.

The acid removed by the coke filter and collected in tank 14 is normally of a strength of about 18 to 22° Baumé, but may be as low as 10° Baumé or in some cases as high as 35° Baumé. The amount of acid removed at this point depends, of course, upon the extent of the partial conversion of the sulfur dioxide to sulfur trioxide in the burners, but in the case where pyrites or other sulfide ores are employed as a source of sulfur, it will constitute from 3 to 8% of the total acid produced. Accordingly, it is highly desirable to recover and concentrate this weak acid into a marketable product in order to maintain high production efficiency and avoid what would otherwise be a very substantial loss of sulfur.

As stated above, it has been customary in the processes heretofore known to circulate a very large amount of relatively strong acid (45 to 55° Baumé) through the scrubbing or cooling towers. This scrubbing acid, in passing through the tower, was of course concentrated a few degrees Baumé, and to reduce it to its normal strength water and the weak acid from the coke filters were added after a small fraction of the concentrated acid had been withdrawn as product. In practice, the amount of product acid constituted about 1 to 2% of the total acid being continuously recirculated through the towers. In this manner, the weak acid from the coke filters was ultimately concentrated but at the expense of handling many times its volume through the scrubbing and cooling towers and of recirculating the acid again and again. In contradistinction to this procedure and based upon the discoveries heretofore enumerated, in my process the weak acid removed by the coke filter is conducted directly, without strengthening, to the cooling or scrubbing towers, dispersed thereinto, and concentrated a substantial amount in a single passage through the towers. In carrying out this step, the acid in the tank 14 is withdrawn by the pump 15 through a conduit 16 and delivered through a pipe line 17 to a suitable liquid filter 18. The filter, which may be of lead wool, serves to remove any particles of coke coming from the coke filters or other solid matter which may interfere with the proper dispersion or spraying of the acid into the cooling towers. From the filter 18 the acid flows through a pump 19 by which it is put under a pressure of 30 to 50 pounds per square inch. This acid under pressure is then conducted by the pipe line 20 to the sprays 6 by which it is injected into the tower in a highly dispersed state.

The amount of weak acid introduced through the sprays 6 is controlled by the valve 21 so that sufficient moisture will be evaporated to lower the temperature of the burner gas below 300° F. and preferably to about 200° F. and so that the weak acid in its passage through the tower will be concentrated at least 15° Baumé and preferably to a final concentration of 50° Baumé or above. In practice it has been found that about 6-9 pounds of weak acid per 1000 cubic feet of burner gas, if highly dispersed, is satisfactory to produce these results. On the other hand, the amount of acid available, i. e., the amount of acid separated out in the coke filter 13 will vary in accordance with the amount of conversion of the sulfur dioxide to sulfur trioxide in the burner as above mentioned, but in nearly all cases it will be found to be less than enough to provide sufficient moisture for the extent of evaporation required to cool the entire volume of hot burner gas. For this reason, the total amount of acid collected in the tank 14 will be returned to and utilized in one or more of the plurality of towers normally employed, according to whether there is more or less weak acid to be concentrated, while the remaining scrubbing or cooling towers will be operated with sprays of water. In ordinary practice when employing pyrites or other sulfide ore as a source of sulfur sufficient acid is collected by the coke filter 13 to provide the proper amount of cooling fluid for about half the number of scrubbing or cooling towers used in the system. Thus as in the accompanying illustration, where two towers are employed, one tower (3) is fed with weak acid from the coke filter and the second tower (4) is fed with water admitted through the conduit 22 and dispersed by the sprays 7, the amount of water being controlled by the valve 23. Obviously, the procedure may be varied in many respects according to the details of a particular installation. Thus, if there is little acid separated out by the coke filters, less than half of the several scrubbing or cooling towers will be fed with acid, or if but a single cooling tower be employed in the purification system, this tower may be operated alternately, first to cool the burner gas by water sprays and then cool the gas by the weak acid with simultaneous concentration of such weak acid. In the usual system, however, a plurality of towers are employed and accordingly any desired number may be operated to utilize the weak acid and the remainder may be operated with water as the cooling fluid, such procedure being clear to one skilled in the art in view of the present disclosure.

The weak acid concentrated from 10-35° Baumé to upwards of 40-60° Baumé in its passage through the tower 3 is removed in liquid form at the outlet 24 and conducted to the tank 25 through line 26 where it is collected and sold as product acid.

In the tower or towers in which water is used as a cooling fluid, the amount of water is preferably regulated so that a major portion is evaporated into the burner gas and there is but a small effluent stream leaving the bottom of the tower. I have discovered that this effluent contains substantially no sulfuric acid, from which fact it appears that the sulfuric acid present in the burner gas is not absorbed to a material extent in the cooling water but passes on in the gas stream. The effluent from the water tower may, therefore, be discharged as waste through line 27 if desired, or it may be conducted to the tank 14 where it is mixed with the weak acid and returned to the acid spray tower.

It will be found desirable to equip each of the several cooling or scrubbing towers with a set of acid sprays and a set of water sprays. One set of sprays only for each tower is shown in the drawing for convenience in illustration. This provision of both acid and water sprays not only provides for operation of any one or more of the towers normally employed for the concentration of the weak acid upon water, but also permits them to be flushed out with water at intervals to remove any sediment which may accumulate therein. According to my preferred method of operation, the towers are operated alternately upon acid and water, respectively. That is, tower 3 will be operated for a given time, say a week, upon acid, and then the valve in line 26 will be closed, valve 28 in the waste line opened, and the tower will then be operated for a like time upon water. Tower 4 is likewise reversed by changing the water spray to acid, closing the valve in waste line 27, and opening the valve in line 29 leading to the product tank. By this procedure, the arsenic and iron oxide which tends to accumulate in the towers when operating upon acid is dissolved and washed out by the water stream and the towers are thus kept clean. This is a distinct commercial advantage over the known procedure employing recirculation of acid, as the laborious and expensive cleaning of the towers attendant upon use of the recirculation method is entirely eliminated.

From the foregoing description, it is apparent that the present novel system of cooling and purification of burner gas avoids the numerous difficulties outlined in connection with the heretofore known systems, more particularly by eliminating the recirculation of the very large quantity of scrubbing acid through the cooling towers, and the opportunity for arsenic deposition from the recirculating acid upon the exposed surfaces of the system. These several features in conjunction with the concentration of the weak acid collected by the coke filter to produce a marketable product by a single contact with the hot burner gas constitute the more important characteristics of the present invention.

Certain modifications may be made in the manner of carrying out my invention, for example, in the manner of causing the high degree of dispersion of the acid or other cooling fluid in the towers or in any other manner for producing intimate contact of the gas and liquid, and I do not wish to limit the scope of the invention except as defined in the appended claims.

I claim:

1. The process of cooling and purifying burner gas which comprises the step of contacting hot burner gas with weak sulfuric acid and so limiting the amount of the weak acid with respect to the gas affected in any single period of contact between the said acid and the said gas as to cause a concentration of said acid of at least 15° Baumé and to produce a product acid of 40°–60° Baumé strength in such single period of contact by effecting the transfer of heat from the hot gas practically wholly by evaporation of water from said acid into said gas.

2. The process of cooling and purifying burner gas which comprises the steps of contacting hot burner gas with sulfuric acid of a strength not substantially over 35° Baumé, and so limiting the amount of the weak acid with respect to the gas affected in any single period of contact between the said acid and the said gas as to cause a substantial concentration of said acid in such single period of contact, by effecting the transfer of heat from the hot gas practically wholly by evaporation of water from said acid into said gas.

3. The process of cooling and purifying burner gas which comprises the step of intimately contacting hot burner gas with highly dispersed sulfuric acid of a strength not substantially greater than 35° Baumé and so limiting the amount of the weak acid with respect to the gas affected in any single period of contact between the said acid and the said gas as to cause a concentration of said acid of at least 15° Baume in such single period of contact, by effecting the transfer of heat from the hot gas practically wholly by evaporation of water from said acid into said gas.

4. The process of cooling and purifying burner gas which comprises the step of intimately contacting hot burner gas with highly dispersed sulfuric acid of a strength not substantially over 35° Baumé, and so limiting the amount of the acid with respect to the gas affected in any single period of contact between the said acid and the said gas as to cause a lowering in temperature of the gas below 300° F. and the production of liquid sulfuric acid having a strength at least 15° Baumé greater than the original strength of said acid.

5. The process of cooling and purifying burner gas which comprises the steps of contacting hot burner gas with weak sulfuric acid of a strength not substantially over 35° Baumé and regulating the amount of such acid to cause the gas to be cooled below 300° F. and the acid to be concentrated at least 15° Baumé.

6. The process of cooling and purifying burner gas which comprises the steps of separating sulfuric acid mist from cooled burner gas on its way to the converter system, utilizing directly the acid thus separated to cool a further quantity of hot burner gas by intimately contacting said hot gas with said acid, and so limiting the amount of the acid with respect to the gas affected in any single period of contact between the said acid and the said gas as to cause a concentration of said acid of at least 15° Baumé and to produce a product acid of 40°–60° Baumé strength in such single period of contact by effecting the transfer of heat from the hot gas practically wholly by evaporation of water from said acid into said gas.

7. The process of cooling and purifying burner gas which comprises the steps of intimately contacting hot burner gas with highly dispersed weak sulfuric acid of a strength not substantially over 35° Baumé, so limiting the amount of the weak acid with respect to the gas affected in any single period of contact between the said acid and the said gas as to cause a concentration of said acid of at least 15° Baumé, in such single period of contact, by effecting the transfer of heat from the hot gas practically wholly by evaporation of water from said acid into said gas, removing the condensed sulfuric acid mist contained in the cooled gas, and utilizing the acid thereby obtained to provide the weak acid above mentioned.

8. The process of cooling and purifying burner gas which comprises the steps of intimately contacting hot burner gas with highly dispersed weak sulfuric acid of a strength not substantially greater than 35° Baumé, so limiting the amount of the weak acid with respect to the gas affected in any single period of contact between the said acid and the said gas as to cause a concentration of said acid of at least 15° Baumé and the production of product acid of 40°–60° Baumé, by effecting the transfer of heat from the hot gas practically wholly by evaporation of water into said gas from said acid, further cooling the gas to condense and separate out a portion of the contained water vapor, then removing the condensed sulfuric acid mist from the cooled gas, and utilizing the acid thereby obtained to provide the weak acid above mentioned.

9. The process of cooling and purifying burner gas which comprises separating hot burner gas into two portions, contacting one portion of such hot gas with weak sulfuric acid under conditions effecting rapid evaporation of the water from the weak acid whereby such portion of the burner gas is cooled below 300° F. and the weak acid is concentrated at least 15° Baumé, contacting the other portion of the hot burner gas with water under conditions effecting rapid evaporation whereby such portion of the burner gas is cooled below 300° F., uniting the several portions of the cooled gas, removing the condensed sulfuric acid mist therein contained and utilizing the acid thereby obtained to provide the weak acid above mentioned.

10. The process of cooling and purifying burner gas which comprises separating hot burner gas into two portions, contacting one portion of such hot gas with weak sulfuric acid under conditions effecting rapid evaporation of the water from the weak acid whereby such portion of the burner gas is cooled below 300° F. and the weak acid is concentrated at least 15° Baumé, contacting the other portion of the hot burner gas with water under conditions effecting rapid evaporation whereby such portion of the burner gas is cooled below 300° F., uniting the several portions of the cooled gas, cooling the gas to condense and separate out a portion of the contained water vapor, then removing the condensed sulfuric acid mist therein contained, and utilizing the acid thereby obtained to provide the weak acid above mentioned.

11. The process of cooling and purifying burner gas which comprises separating hot burner gas into two portions, contacting in counter current flow one portion of such hot gas with weak sulfuric acid of a strength less than 35° Baumé under conditions effecting the rapid evaporation of the water therefrom whereby such portion of the burner gas is cooled to below 300° F. and the weak acid is concentrated at least 15° Baumé, contacting the other portion of the hot burner gas with water under conditions effecting rapid evaporation whereby such portion of the hot gas is cooled below 300° F., uniting the several portions of the cooled gas, removing the condensed sulfuric acid mist therein contained, and utilizing the acid thereby obtained to provide the weak acid above mentioned.

12. The process of cooling and purifying burner gas which comprises separating hot burner gas into two portions, contacting in counter current flow one portion of such hot gas with weak sulfuric acid of a strength less than 35° Baumé under conditions effecting rapid evaporation of the water therefrom whereby such portion of the burner gas is cooled to below 300° F. and the weak acid is concentrated at least 15° Baumé, contacting the other portion of the hot burner gas with water under conditions effecting rapid evaporation whereby such portion of the burner gas is cooled below 300° F., regulating the amount of water to provide for evaporation of a major portion thereof into the burner gas, removing the effluent liquid, uniting the several portions of the cooled gas, removing the condensed sulfuric acid mist therein contained, uniting the effluent stream of water above mentioned with the acid thereby obtained, and utilizing such mixed liquids to provide the weak acid above mentioned.

13. The process of cooling and purifying burner gas which comprises passing hot burner gas through a tower in contact with a stream of sulfuric acid, and at intervals stopping the flow of acid and substituting a stream of water, while continuing the flow of burner gas, whereby any impurities deposited in the tower from the stream of acid will be washed out of the tower by the stream of water.

14. The process of cooling and purifying burner gas which comprises separating hot burner gas into two portions, passing one portion of such hot gas through a tower in intimate contact with a stream of weak sulfuric acid, passing the other portion of such hot gas through another tower in intimate contact with a stream of water, and at intervals alternating the flow of acid and of water through the respective towers, whereby any impurities deposited in a tower from the stream of acid will be washed out of the tower by the stream of water.

15. The process of cooling and purifying burner gas which comprises separating hot burner gas into two portions, passing one portion of such hot gas through a tower in intimate contact in counter-current flow with a stream of weak sulfuric acid of not over 35° Baumé, so limiting the amount of the weak acid with respect to the gas affected in any single period of contact between the said acid and the said gas as to cause a cooling of said gas to below 300° F. and a concentration of said acid of at least 15° Baumé in such single period of contact, by effecting the transfer of heat from the hot gas practically wholly by evaporation of water into said gas from said acid, passing the other portion of said hot gas through another tower in intimate contact with a stream of water, regulating the amount of water to cause a cooling of the hot gas to below 300° F., uniting the several portions of the cooled gas, removing the condensed sulfuric acid mist therein contained, utilizing the acid thereby obtained to provide the weak acid above mentioned, and at intervals alternating the flow of acid and of water through the respective towers, whereby any impurities deposited in a tower from the stream of acid will be washed out of the tower by the stream of water.

16. The process of cooling and purifying burner gas which comprises the step of contacting hot burner gas with weak sulfuric acid and regulating the amount of weak acid with respect to the gas affected in any single period of contact between the said gas and the said acid as to cause a concentration of said acid of at least 15° Baumé and a lowering in temperature of the gas below 300° F. in such single period of contact, by effecting the transfer of heat from the hot gases practically wholly by evaporation of water from said acid into said gas.

17. The process of cooling and purifying burner gas which comprises the steps of separating sulfuric acid mist from cooled burner gas on its way to the converter system, utilizing directly the acid thus separated to cool a further quantity of hot burner gas by intimately contacting said hot gas with said acid and regulating the amount of the acid with respect to the gas affected in any single period of contact between the said acid and the said gas as to cause a concentration of said acid of at least 15° Baumé and a lowering in temperature of the gas below 300° F. to produce a product acid of 40–60° Baumé strength in such single period of contact by effecting the transfer of heat from the hot gas practically wholly by evaporation of water from said acid into said gas.

18. The process of cooling and purifying burner gas which comprises the step of contacting hot burner gas with sulfuric acid and so limiting the amount of the acid with respect to the gas affected in any single period of contact between the said acid and the said gas as to cause a concentration of said acid of at least 15° Baumé in such single period of contact, by effecting the transfer of heat from the hot gas practically wholly by evaporation of water from said acid into said gas.

19. The process of cooling and purifying burner gas which comprises the steps of separating sulfuric acid mist from cooled burner gas on its way to a converter system, utilizing directly the acid thus separated to cool a further quantity of hot burner gas by intimately contacting said hot gas with said acid and regulating the amount of the acid with respect to the gas affected in any single period of contact between the said acid and the said gas as to cause a concentration of said acid of at least 15° Baumé and a lowering in temperature of the gas below 300° F. in such single period of contact by effecting the transfer of heat from the hot gas practically wholly by evaporation of water from said acid into said gas.

EDWIN J. MULLEN.